(12) United States Patent
Kerdemelidis et al.

(10) Patent No.: US 7,979,612 B2
(45) Date of Patent: Jul. 12, 2011

(54) COMMUNICATION METHOD AND APPARATUS

(75) Inventors: Theodore Kerdemelidis, Christchurch (NZ); Andreiko Kerdemelidis, Christchurch (NZ)

(73) Assignee: Keyghost Limited, Christchurch (NZ)

( * ) Notice: Subject to any disclaimer, the term of this patent is extended or adjusted under 35 U.S.C. 154(b) by 849 days.

(21) Appl. No.: 10/554,534

(22) PCT Filed: Apr. 28, 2004

(86) PCT No.: PCT/NZ2004/000081
§ 371 (c)(1),
(2), (4) Date: Aug. 17, 2006

(87) PCT Pub. No.: WO2004/097614
PCT Pub. Date: Nov. 11, 2004

(65) Prior Publication Data
US 2007/0061491 A1    Mar. 15, 2007

(30) Foreign Application Priority Data

Apr. 28, 2003  (NZ) .................................... 525460
Apr. 28, 2003  (NZ) .................................... 525461
Aug. 5, 2003   (NZ) .................................... 527373

(51) Int. Cl.
*G06F 13/00*   (2006.01)
*G06F 3/00*    (2006.01)
(52) U.S. Cl. ............... 710/67; 710/15; 710/36; 710/65
(58) Field of Classification Search ................ None
See application file for complete search history.

(56) References Cited

U.S. PATENT DOCUMENTS

| 5,802,318 | A   | 9/1998  | Murray et al. |
| 5,896,125 | A   | 4/1999  | Niedzwiecki |
| 5,898,861 | A   | 4/1999  | Emerson et al. |
| 5,991,546 | A   | 11/1999 | Chan et al. |
| 6,181,262 | B1  | 1/2001  | Bennett |
| 6,488,584 | B2  | 12/2002 | Nelson |
| 6,529,505 | B1* | 3/2003  | Davis et al. .................. 370/389 |
| 6,532,499 | B1  | 3/2003  | Nakamura |
| 2001/0003205 | A1* | 6/2001 | Gilbert .......................... 713/320 |
| 2001/0003827 | A1* | 6/2001 | Shimamura .................. 709/206 |
| 2002/0091850 | A1* | 7/2002 | Perholtz et al. .............. 709/231 |

FOREIGN PATENT DOCUMENTS
WO    WO 90/02993    3/1990

OTHER PUBLICATIONS

IEEE Transactions on Systems, Man, and Cybernetics; pp. 236-241; vol. 28, No. 2, Mar. 1998; "Computer User Verification Using Login String Keystroke Dynamics"; Robinson, Liang, Chambers and MacKenzie; 1998 IEEE.
IEEE Transactions on Systems, Man, and Cybernetics; pp. 261-269; vol. 27, No. 2, Apr. 1997; "Verification of Computer Users Using Keystroke Dynamics" Obaidat and Sadoun; 1997 IEEE.

* cited by examiner

*Primary Examiner* — Tariq Hafiz
*Assistant Examiner* — Scott Sun

(57) ABSTRACT

A communication method allows a host to access and send commands to an apparatus across a network or communication system by encoding data as a sequence of status signals and sending the data from the host on a communication channel between the host and an auxiliary device. The apparatus detects the status signals sent on the communication channel and decodes the status signals to retrieve the data. The apparatus further comprises a data filter to filter keystroke data by removing break code data. The keystroke data can be reconstructed by the host.

29 Claims, 12 Drawing Sheets

Figure 1a      PRIOR ART
Male 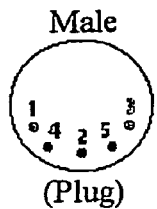 Female 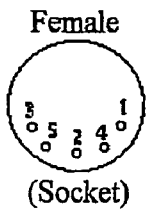
(Plug)                (Socket)
5-pin DIN (AT/XT):
1 - Clock
2 - Data
3 - Not Implemented
4 - Ground
5 - Vcc (+5V)
Figure 1b      PRIOR ART
Male 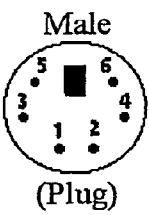 Female 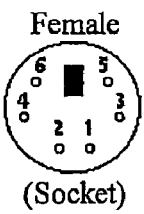
(Plug)               (Socket)
6-pin Mini-DIN (PS/2):
1 – Data
2 – Not Implemented
3 – Ground
4 – Vcc (+5V)
5 - Clock
6 - Not Implemented
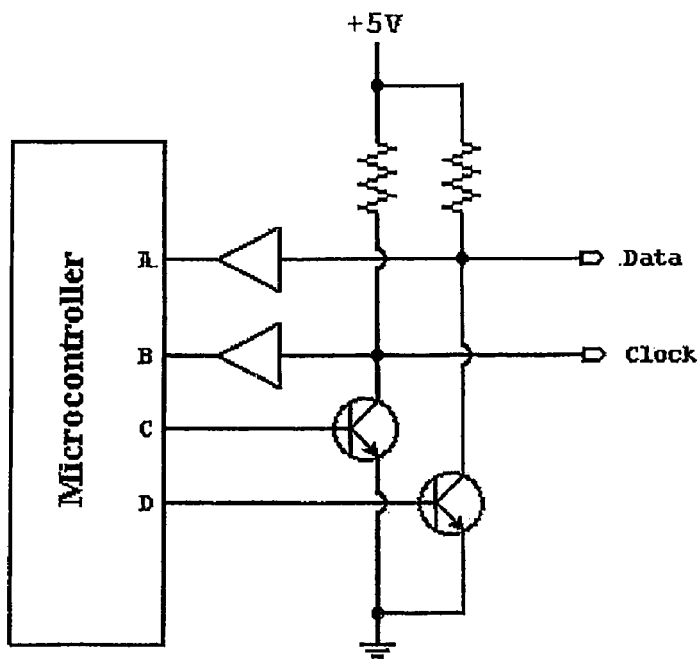
Figure 2      PRIOR ART

Figure 8    PRIOR ART

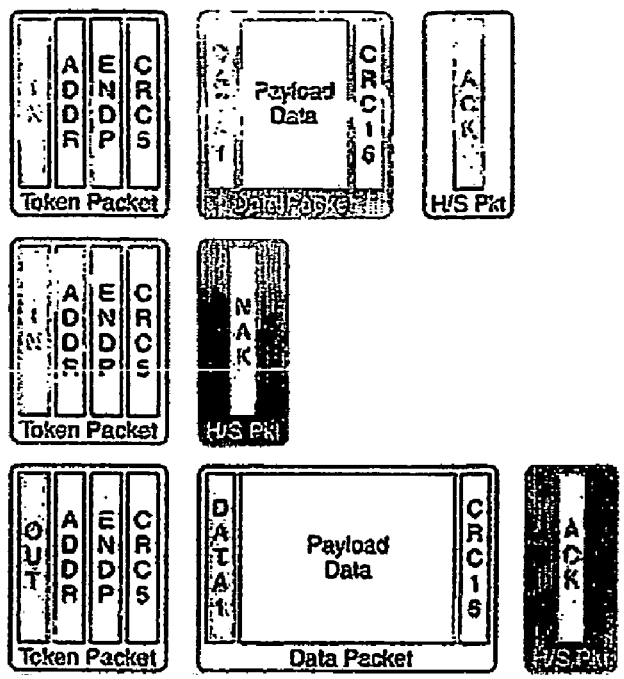

Figure 9    PRIOR ART

```
USAGE_PAGE (Generic Desktop)                              05 01
USAGE (Keyboard)                                          09 06
COLLECTION (Application)                                  A1 01
  USAGE_PAGE (Keyboard)                                   05 07
  USAGE_MINIMUM (Keyboard LeftControl)                    19 E0
  USAGE_MAXIMUM (Keyboard Right GUI)                      29 E7
  LOGICAL_MINIMUM (0)                                     15 00
  LOGICAL_MAXIMUM (1)                                     25 01
  REPORT_SIZE (1)                                         75 01
  REPORT_COUNT (8)                                        95 08
  INPUT (Data,Var,Abs)                                    81 02
  REPORT_COUNT (1)                                        95 01
  REPORT_SIZE (8)                                         75 08
  INPUT (Cnst,Var,Abs)                                    81 03
  REPORT_COUNT (5)                                        95 05
  REPORT_SIZE (1)                                         75 01
  USAGE_PAGE (LEDs)                                       05 08
  USAGE_MINIMUM (Num Lock)                                19 01
  USAGE_MAXIMUM (Kana)                                    29 05
  OUTPUT (Data,Var,Abs)                                   91 02
  REPORT_COUNT (1)                                        95 01
  REPORT_SIZE (3)                                         75 03
  OUTPUT (Cnst,Var,Abs)                                   91 03
  REPORT_COUNT (6)                                        95 06
  REPORT_SIZE (8)                                         75 08
  LOGICAL_MINIMUM (0)                                     15 00
  LOGICAL_MAXIMUM (101)                                   25 65
  USAGE_PAGE (Keyboard)                                   05 07
  USAGE_MINIMUM (Reserved (no event indicated))           19 00
  USAGE_MAXIMUM (Keyboard Application)                    29 65
  INPUT (Data,Ary,Abs)                                    81 00
END_COLLECTION                                            C0
```

Figure 10     PRIOR ART

| 5 bits (LED status information); 3 bits (reserved, byte padding) |
|---|

Figure 11     PRIOR ART

| Modifier | Reserved | Char0 | Char1 | Char2 | Char3 | Char4 | Char5 |
|---|---|---|---|---|---|---|---|

Figure 19

| Always 0 | Always 0 | Always 0 | Always 0 | Always 0 | Caps Lock | Num Lock | Scroll Lock |

MSB                                                                                          LSB

-"Scroll Lock" - Scroll Lock LED off(0)/on(1)

-"Num Lock" - Num Lock LED off(0)/on(1)

-"Caps Lock" - Caps Lock LED off(0)/on(1)

Figure 20

Byte stream to turn on num-lock LED (if caps-lock and scroll lock LED is off):

0xED - from host, command to initiate an LED set/reset

0xFA - from keyboard, acknowledge receipt of set/reset LED command

0x02 - the argument byte, with the num-lock LED bit set, sent from the host

0xFA - from keyboard, acknowledge receipt of argument byte

Byte stream to turn off num-lock LED (if caps lock and scroll lock LED is off)

0xED - from host, command to initiate an LED set/reset

0xFA - from keyboard, acknowledge receipt of set/reset LED command

0x00 - the argument byte, with the num-lock LED bit cleared, sent from the host

0xFA - from keyboard, acknowledge receipt of argument byte

Out Token (Host to USB Keyboard Packet)

0x11 - Out PID

0x58 - 7 bit address

0x02 - Endpoint

0x03 - CRC 5

Data Packet (Host to USB Keyboard Packet)

0x33 - Data PID

0x02 - Set num-lock

0xC1, 0x81 - CRC 16

ACK (USB Keyboard to host Packet)

0x22 - PID

COMMUNICATION METHOD AND APPARATUS

FIELD OF THE INVENTION

The invention relates to a method of communication that allows a host to access and send commands to an apparatus across a network or communication system. The invention also relates to data filtration that enables efficient data storage and high-speed upload of recorded data to the host.

BACKGROUND OF THE INVENTION

1. Introduction

In the remainder of the document, the computer will be referred to as 'the host' and any external hardware capable of being connected to the host through a USB or PS/2 port (including keyboard and key-stroke monitoring hardware) will be referred to as a 'device'.

The PS-2 serial bus interface is the ubiquitous method by which a keyboard is connected to a PC computer. Other, less commonly used technologies are the RS-232 bus and USB (Universal Serial Bus).

The term "Keystroke data" is used in the specification to refer to the make and a break codes sent from a keyboard to a connected device in response to activation of a key of a keyboard.

The term "status signals" is used in the specification to refer to any status commands or data that may be sent from the host to a device which are capable of encoding a data stream (but excludes make or break codes as these cannot be sent from the host to a device).

2. The PS/2 Interface

The PS/2 device interface was developed by IBM and originally appeared in the IBM Technical Reference Manual. The physical PS/2 port is one of two styles of connectors: the 5-pin DIN or the 6-pin mini-DIN. Both connectors are electrically similar; the only practical difference between the two is the arrangement of pins, the two can be made compatible with adaptors. The pinouts for a 5-pin DIN are shown in FIG. 1a and those for a 6-pin mini-DIN are shown in FIG. 1b.

2.1 The Electrical Interface

Vcc/Ground provide power to the keyboard.
Summary: Power Specifications
Vcc=+5V.
Max Current=100 mA.

The Data and Clock lines are both open-collector with pull-up resistors to +5V. An "open-collector" interface has two possible states: low, or high impedance. In the "low" state, a transistor pulls the line to ground level. In the "high impedance" state, the interface acts as an open circuit and does not drive the line low or high. Furthermore, a "pullup" resistor is connected between the bus and Vcc so the bus is pulled high if none of the devices on the bus are actively pulling it low. The exact value of this resistor is not too important (1~10 kOhms); larger resistances result in less power consumption and smaller resistances result in a faster rise time. A general open-collector interface is shown in FIG. 2.

Data and Clock are read on the microcontroller's pins A and B, respectively. Both lines are normally held at +5V, but can be pulled to ground by asserting logic "1" on C and D. As a result, Data equals D, inverted, and Clock equals C, inverted.

2.2 PS-2 Communication: General Description

The PS/2 keyboard implements a bi-directional synchronous serial protocol. The bus is "idle" when both lines are high (open-collector). This is the only state where the keyboard is allowed to begin transmitting data. The host has ultimate control over the bus and may inhibit communication at any time by pulling the Clock line low. The device always generates the clock signal. If the host wants to send data, it must first inhibit communication from the keyboard by pulling Clock low. The host then pulls Data low and releases Clock. This is the "Request-to-Send" state and signals the keyboard to start generating clock pulses.

Summary: Bus States
Data=high, Clock=high: Idle state.
Data=high, Clock=low: Communication Inhibited.
Data=low, Clock=high: Host Request-to-Send All data is transmitted one byte at a time and each byte is sent in a frame consisting of 11-12 bits. These bits are:
1 start bit. This is always 0.
8 data bits, least significant bit first.
1 parity bit (odd parity).
1 stop bit. This is always 1.
1 acknowledge bit (host-to-device communication only)

The parity bit is set if there is an even number of 1's in the data bits and reset (0) if there is an odd number of 1's in the data bits. The number of 1's in the data bits plus the parity bit always adds up to an odd number (odd parity). This is used for error detection. The keyboard must check this bit and if incorrect it should respond as if it had received an invalid command. Data sent from the keyboard to the host is read on the falling edge of the clock signal; data sent from the host to the keyboard is read on the rising edge. The clock frequency must be in the range 10-16.7 kHz. This means clock must be high for 30-50 microseconds and low for 30-50 microseconds. The keyboard always generates the clock signal, but the host always has ultimate control over communication.

2.3 Communication: Device-to-Host

The Data and Clock lines are both open collector. A resistor is connected between each line and +5V, so the idle state of the bus is high. When the keyboard wants to send information, it first checks the Clock line to make sure it is at a high logic level. If it is not, the host is inhibiting communication and the keyboard must buffer any to-be-sent data until the host releases Clock. The Clock line must be continuously high for at least 50 microseconds before the keyboard can begin to transmit its data. Here is an illustrated example of an 11-bit frame from the PS/2 communications protocol:
1 start bit. This is always 0.
8 data bits, least significant bit first.
1 parity bit (odd parity).
1 stop bit. This is always 1.

The keyboard writes a bit on the Data line when Clock is high, and the host reads it when Clock is low. FIGS. 3 and 4 illustrate this.

The Data line changes state when Clock is high and that data is valid when Clock is low. The clock frequency is 10-16.7 kHz. The time from the rising edge of a clock pulse to a data transition must be at least 5 microseconds. The time from a data transition to the falling edge of a clock pulse must be at least 5 microseconds and no greater than 25 microseconds. The host may inhibit communication at any time by pulling the Clock line low for at least 100 microseconds. If a transmission is inhibited before the 11th clock pulse, the keyboard must abort the current transmission and prepare to retransmit the current packet of data when host releases Clock. A packet of data could be, for example, a two-frame <break code>. If a keyboard is interrupted while sending the second byte of the two-frame break code, it will need to retransmit both frames of that break code, not just the frame that was interrupted. If the host pulls clock low before the first high-to-low clock transition, or after the falling edge of the last clock pulse, the keyboard/mouse does not need to retransmit any data. However, if new data is created that needs to be transmitted, it will have to be buffered until the host releases Clock. (Keyboards have a 16-byte buffer for this purpose. If more than 16 bytes worth of keystrokes occur, further keystrokes will be ignored until there is room in the buffer).

2.4 Host-to-Keyboard Communication

The packet is sent a little differently in a host-to-keyboard communication. The PS/2 keyboard always generates the clock signal. If the host wants to send data, it must first put the Clock and Data lines in a "Request-to-send" state as follows:

Inhibit communication by pulling Clock low for at least 100 microseconds.

Apply "Request-to-send" by pulling Data low, and then release Clock.

The keyboard should check for this state at intervals not to exceed 10 milliseconds. When the keyboard detects this state, it will begin generating Clock signals and clock in eight data bits and one stop bit. The host changes the Data line only when the Clock line is low, and the keyboard reads data when Clock is high. This is opposite of what occurs in device-to-host communication. After the stop bit is received, the keyboard will acknowledge the received byte by bringing the Data line low and generating one last clock pulse. If the host does not release the Data line after the 11th clock pulse, the keyboard will continue to generate clock pulses until the Data line is released (the device will then generate an error.) The host may abort transmission at time before the 11th clock pulse (acknowledge bit) by holding Clock low for at least 100 microseconds.

Here are the steps the host must follow to send data to a PS/2 keyboard device:

1) Bring the Clock line low for at least 100 microseconds.
2) Bring the Data line low.
3) Release the Clock line.
4) Wait for the device to bring the Clock line low.
5) Set/reset the Data line to send the first data bit
6) Wait for the device to bring Clock high.
7) Wait for the device to bring Clock low.
8) Repeat steps 5-7 for the other seven data bits and the parity bit
9) Release the Data line.
10) Wait for the device to bring Data low.
11) Wait for the device to bring Clock low.
12) Wait for the device to release Data and Clock FIG. 4 shows this graphically and FIG. 5 separates the timing to show which signals the host generates, and which does the PS/2 device generate. Illustrated in FIG. 5. part (a) the host requests to transmit data by pulling clock line low. In part (b) the keyboard generates the clocking signal and the host sends the data.

2.5 PS/2 Data Formatting

The purpose of a keyboard using the PS/2 protocol is to communicate to the PC which keys are being pressed down and when they are released. It does this in two parts. The keyboard sends one packet of data when a key is pressed down (called a 'make' scan code), and another when it is released (called a 'break' scan code). Examples of these are given in Table 1 below:

TABLE 1

Examples of Scan Codes produced on Standard PS/2 Keyboard.

| Key Pressed | Make Code | Break Code |
| --- | --- | --- |
| A | 1C | F0 1C |
| B | 32 | F0 32 |
| Ctrl | 14 | F0 14 |
| F10 | 09 | F0 09 |
| PgUp | E0 7D | E0 F0 7D |

2.6 Current Methods of Keystroke Retrieval Via PS/2

As at the current state-of-the-art, the devices' method of retrieval via the PC keyboard PS/2 plug involves sending all keystroke information down the keyboard PS/2 line as complete keystrokes, including the 'make' scan code and 'break' scan codes. This method conforms with the industry standard specifications for keyboard to PC communications. Current devices essentially mimic a user typing the keystrokes at speed on a standard keyboard.

3. USB Bus Basics

The Universal Serial Bus (USB) provides a common means of attaching peripherals to a computer system. It has been designed to replace legacy busses such as the RS-232 and PS/2. The USB bus provides a limited power supply to peripherals as well as a mechanism for bi-directional data transfer.

3.1 Terminology

USB is a means of connecting devices to a computer host (USB host). Multiple devices are connected onto the bus with the use of USB hub devices. The USB host often has a root hub allowing multiple devices to be connected directly to the computer. Data transfers from the USB host to devices are regarded as downstream transfers with upstream transfers going from device to host. FIG. 6 gives an overview of a typical USB system.

3.2 Electrical Signalling

USB has to offer high-speed signalling over a short (shielded) cable; this is accomplished through the use of differential signalling. Differential signalling works by sending opposing signals down each wire of the USB signalling pair; this improves performance by reducing noise and allows faster data transfers. Single ended signalling (setting both wires in the pair to the same value) is used in combination with differential signalling to perform handshaking duties. USB uses half-duplex transfers over the signalling pair; this ensures only one device (be it host or peripheral) drives the bus at any given time. All transfers are host initiated in a master-slave arrangement—the host indicates when a slave device may drive the bus.

3.3 Data Encoding

To ensure acceptable signalling performance NRZI (Non Return Zero Inverted) coding is required. In addition, as no clock indicating each successive bit is used (the clock is recovered from the data) extra information is embedded into the data-stream to encode that information. The discussion of these topics is out of the scope of this document and is well described in [2].

3.4 Packet Structure

USB transfers data in packets. A packet is simply an arbitrary amount of data with a fixed structure and end of packet indication. In this case, each packet has a defined header specifying the type of transfer and often the device to which the data is sent.

FIG. 7 shows the structure of a USB data packet. Each packet has 8 synchronisation bits sent—these are used to align the data in the receiver properly and ensure reliable data transmission. The next part of the packet is the packet identifier (PID), this indicates the type of packet being sent and is comprised of 4 bits then those 4 bits repeated and inverted (allowing error detection). Following that is optional extra data comprising the packet payload and finally a mandatory end-of-packet indication (EOP) using single ended signalling. USB 1.1 defines 10 packet types [1], these are shown in Table 1.

TABLE 1

USB packet types.

| PID | Packet Type | Category |
|---|---|---|
| 0101 | SOF | Token |
| 1101 | SETUP | Token |
| 1001 | IN | Token |
| 0001 | OUT | Token |
| 0011 | DATA0 | Data |
| 1011 | DATA1 | Data |
| 0010 | ACK | Handshake |
| 1010 | NAK | Handshake |
| 1110 | STALL | Handshake |
| 1100 | PRE | Special |
| Rest | Reserved | N/A |

Token packets are used by the host to indicate to devices when to drive the bus (or listen for data). Data packets are used for transferring data and handshaking packets to ensure successful data delivery. The special packet is for backward compatibility with low-speed USB systems—they are used to put the USB in slow-speed mode. Further discussion of special packets is outside the scope of this document. USB 2.0 also adds the NYET handshaking packet (see [1]).

3.5 Transactions

USB transactions are made up of a number of packets in a predefined sequence. USB defines 4 major modes of communication. Control, Bulk, Interrupt, and Isochronous. Bulk and Isochronous transactions are outside the scope of this document.

Interrupt transfers are typically used by devices such as keyboards and mice that must transfer small amounts of data frequently. FIG. 8 shows 3 such interrupt transactions. In each case the host initiates the transfer with a token packet, data is sent (by either host or device depending on IN/OUT), successful transmission is acknowledged. Unsuccessful transmission or data not being ready are signalled with NAK packets.

Control transfers are more complicated and use a 3-stage approach. The host sends a SETUP packet, followed by an 8-byte (setup) data packet; and the device must acknowledge this. If required, further data packets are transferred using the same form of packet handshaking as interrupt data transfers (note multiple transfers may be needed to provide all the data). Note that the data transfer must either be a read (IN) or write (OUT) no mixing is possible. Following the (optional) data transfer, control status is exchanged using a zero-length packet for acknowledge and NAK for failure. The host acknowledges control reads, the device acknowledges control writes and also no data transfer (just setup). There are a number of standard control requests to a device and these are listed in Table 2. The requests are sent as part of the setup data packet and are used to perform initial device configuration.

TABLE 2

SETUP packet requests.

| Request | Action |
|---|---|
| GetStatus | Return current status |
| ClearFeature | Clear specified feature |
| SetFeature | Set specified feature |
| SetAddress | Set the USB address the device communicates on |
| GetDescriptor | Get the device descriptor |
| SetDescriptor | Set device descriptor |
| GetConfiguration | Get configuration number (or 0 if not configured) |
| SetConfiguration | Set configuration to that specified |
| GetInterface | Get current interface |
| SetInterface | Set interface for the device to use |
| SyncFrame | Synchronise USB Frame numbers |

3.6 Device Enumeration (Connection)

When a USB device is connected to a USB hub, the hub notifies the host (when polled) that a new device is connected. The hub resets the device and signals to the host that the device is ready for communications at address 0x00 (default address).

A number of control transactions are completed to allow the host to communicate with the device; these are listed below:

GetDescriptor (device): Host sends a SETUP packet control sequence to address 0x00 requesting its device description.

SetAddress: Host sets the address on which the device will communicate from now on.

GetDescriptor (device): Re-requests the device descriptor—if this is different to the earlier response an error has occurred;

GetConfiguration (device): Host retrieves all of the configuration information from the device. This means (all) configurations and their properties are described.

SetConfiguration: Host chooses one of the possible configurations and sets the device to use that one.

After this enumeration phase, the host is able to initiate any of the 4 transaction types to/from the device.

3.7 Keyboard Data Format

Keyboards typically follow the Human Interface Device (HID) class specification [1], to allow standard drivers to access the device. Device drivers for HID devices are typically included with the host operating system.

Using the HID specification ensures devices use interrupt (or control) transactions only. Typically control transactions are used to initialise the device and interrupt transactions used to transfer data. An example keyboard report description is shown in FIG. 9. Note input/output description is relative to the host—they are reversed relative to the device.

The report above defines the data expected back from the keyboard. Typically the host operating system parses these reports to allow device communications to be understood.

Keyboards typically follow a standard report similar to the one above; they allow 1 byte of information to be transferred from host to keyboard indicating LED status (output), and 8 bytes from keyboard to host indicating key status. The format of those reports is indicated in FIGS. 10 and 11.

The (downstream) input report shown in FIG. 10 is straightforward, 5 bits of information command the current status of the keyboard LEDs. The other 3 bits are simply used for padding.

The (upstream) output report shown in FIG. 11 is more complex than the input report. The first bytes gives the status of the 8 modifier keys (l-ctrl, l-alt, l-shift, l-gui, r-ctrl, r-alt, r-shift, r-gui) with one bit assigned to each. The next byte is reserved and the remaining 6 are used for indicating the USB HID scancodes [3] corresponding to the keys currently pressed. (The state occurring when more than six non-modifier keys are pressed is called the phantom state and is beyond the scope of this document).

In a typical usage scenario the host will initiate an incoming interrupt transfer to poll the keyboard status (request keyboard reports on a regular basis) or initiate an outgoing interrupt transfer to set the LED's status.

3.8 References

[1] www.usb.org (official USB 1.1 and 2.0 specifications)
[2] USB design by Example, John Hyde, Intel University Press 1999.
[3] USB HID to PS/2 Scan Code Translation Table, Microsoft Corporation, 1999.

SUMMARY OF THE INVENTION

It is an object of this invention to enable a hardware apparatus connected to a computer port to allow host-to-apparatus communication while remaining undetected by the host and without resorting to low-level driver programming, or at least to provide the public with a useful choice.

It is also an object of the present invention is to provide a method to send login information and commands to an apparatus monitoring the PS/2 or USB keyboard without requiring physical access to the monitored keyboard, or at least provide the public with a useful choice. The ability to log in to the apparatus and send commands to enable a recorded keystroke log to be retrieved without a user typing on the monitored keyboard is very advantageous, as it enables a user to retrieve the log off the apparatus using software and/or over a network via remote access, without having to manually remove the apparatus from the computer.

It is also an object of the present invention to provide a method to increase the rate of transmission of keystroke data, or at least provide the public with a useful choice.

In a first aspect the invention provides a method of communicating with a monitoring apparatus, including the steps of: encoding first data as a sequence of status signals; wherein the first data is intended for receipt by the monitoring apparatus; sending the status signals from a host on a communication channel linking the host and an auxiliary device; detecting the status signals on the communication channel using the monitoring apparatus; and decoding the status signals in the monitoring apparatus to retrieve the first data.

In a second aspect the invention provides a communication method, including the steps of: filtering keystroke data to remove break code data; and uploading the filtered keystroke data from a keystroke-recording apparatus to a host.

In a third aspect the invention provides a communication method, including the steps of: monitoring a communication channel for keystroke data; filtering the keystroke data to remove break code data; and storing the filtered keystroke data in memory.

In a fourth aspect the invention provides an apparatus including a processor and a memory, wherein the processor includes: a data monitor to detect a sequence of status signals on a communication channel between a host and an auxiliary device; and a decoder to decode the sequence of status signals and retrieve first data encoded in the sequence of status signals.

In a fifth aspect the invention provides an apparatus including a processor, wherein the processor includes: a data monitor to monitor signals on a communication channel between a host and an auxiliary device; and a data filter to filter keystroke data by removing break code data; the apparatus including a memory to store the filtered keystroke data.

In a sixth aspect the invention provides an apparatus including a memory and a processor, configured to: filter keystroke data to remove break code data; and upload the filtered keystroke data to a host.

In a seventh aspect the invention provides a system including a host, an auxiliary device and a monitoring apparatus, the host being connected to the auxiliary device via a communication channel and the monitoring apparatus being configured to: detect status signals on the communication channel between the host and the auxiliary device; and decode the status signals to retrieve data encoded in the status signals.

In an eighth aspect the invention provides keystroke data, wherein the keystroke data has been filtered to remove break code data.

BRIEF DESCRIPTION OF THE DRAWINGS

The invention will be described by way of example only with reference to the drawings, in which:

FIG. 1A shows the pinouts for a 5 pin DIN connector;
FIG. 1B shows the pinouts for a 6 pin DIN connector;
FIG. 2 is a circuit diagram of a general open-collector PS/2 interface;
FIG. 8 illustrates interrupt transfers in a USB system;
FIG. 9 shows an example of a keyboard report descriptor in a USB system;
FIG. 10 shows the format of a device input report in a USB system;
FIG. 11 shows the format of a device output report in a USB system;
FIG. 19 is an example of a binary data stream sent host-device-host to toggle an LED in a PS/2 keyboard;
FIG. 20 is a description of an 'argument' byte encoding information for a keyboard LED status change in PS/2 keyboards.

DETAILED DESCRIPTION OF THE PREFERRED EMBODIMENTS

The invention will be described in relation to a PS/2 keyboard-monitoring apparatus and a USB keyboard-monitoring apparatus. The layout of the modules and methods of communicating and decoding the protocol differ according to whether the preferred embodiments of the invention monitor PS/2 or USB keyboards and thus will be separately described in the document, however, the overall method allowing communication to the apparatus is the same. The method allowing high-speed transfer of recorded keystrokes only applies to the apparatus monitoring PS/2 keyboards and will be described last.

Figure 12:
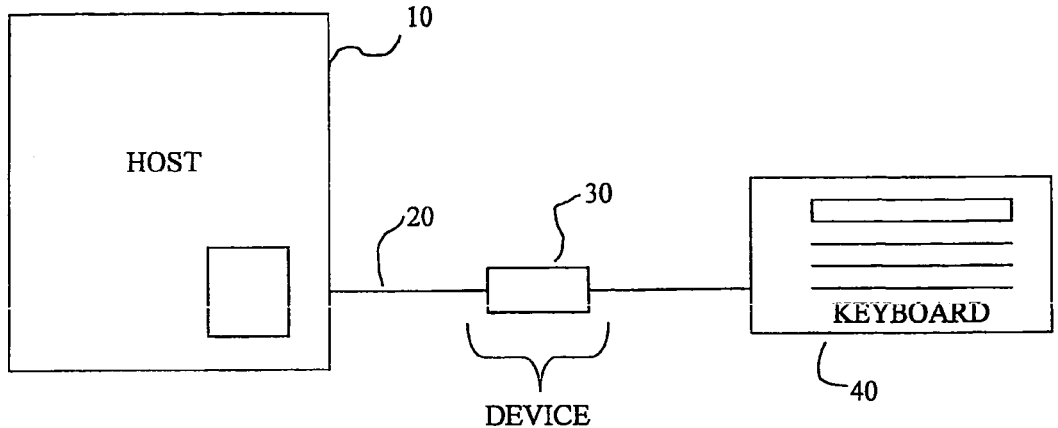
FIGS. 12 and 13 show a PS/2 apparatus connected to a keyboard on a PS/2 cable to allow monitoring of keystroke commands.
Figure 13:
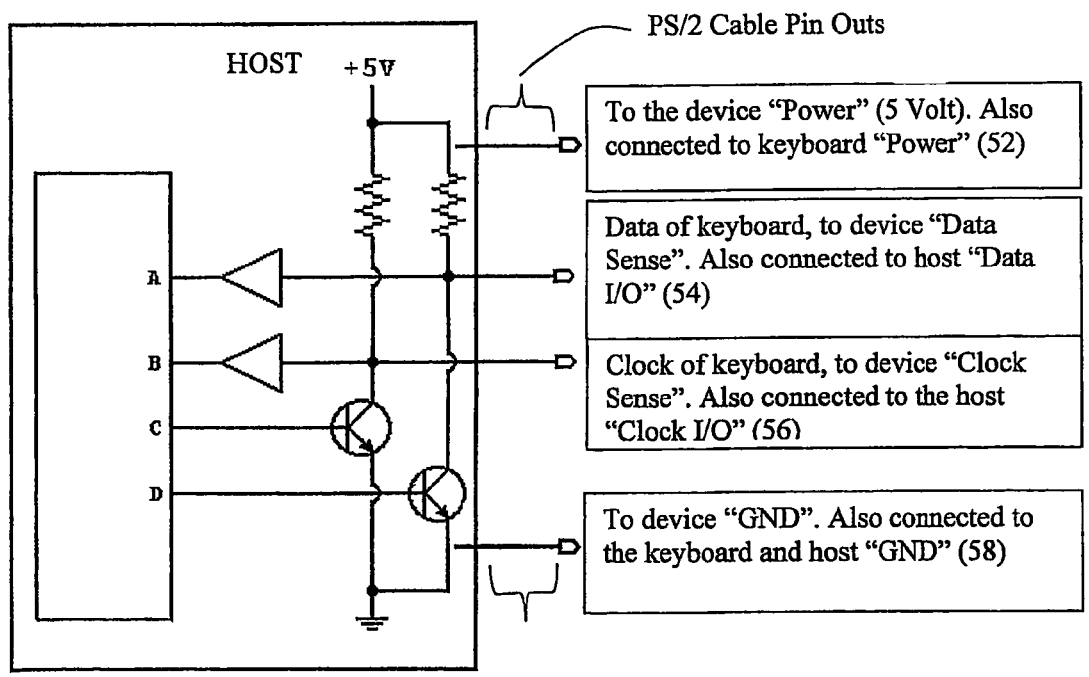
Figure 14:
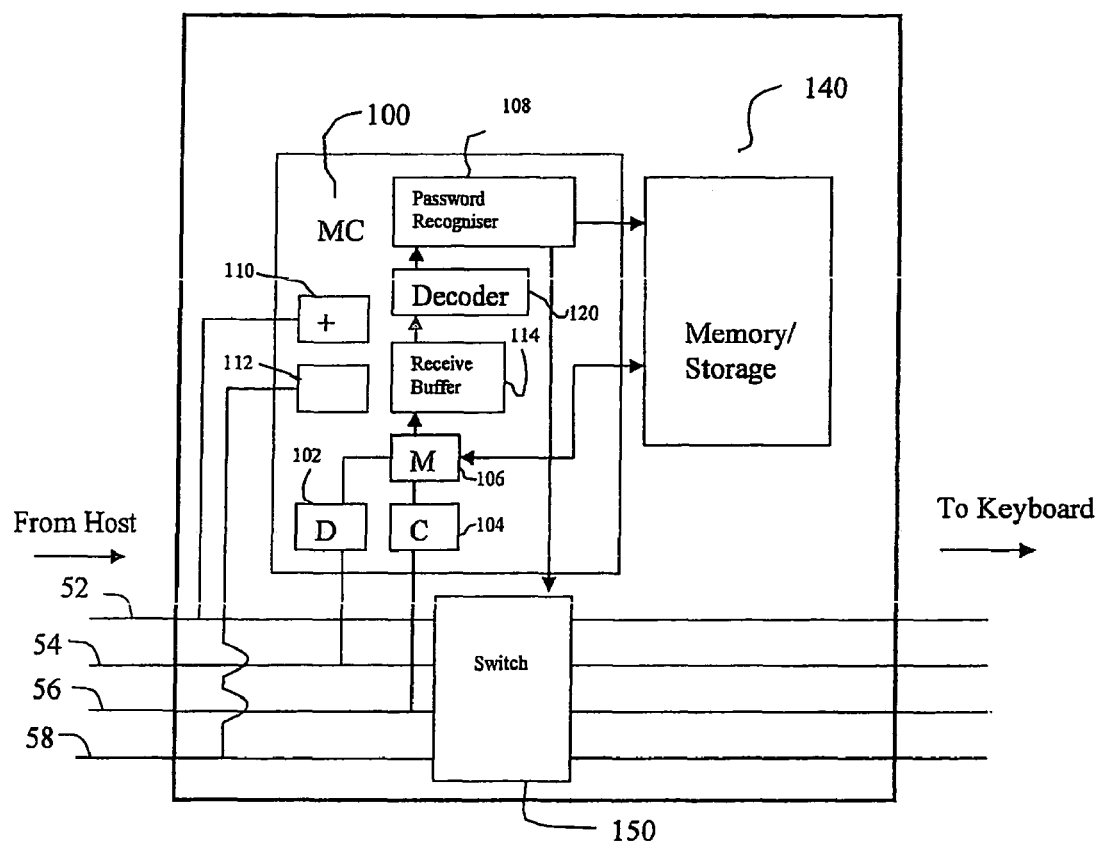
FIG. 14 shows the apparatus connected inline along a PS/2 port utilising PS/2 protocol.

Referring to FIG. 12, the PS/2 cable 20 connects the host 10 to the keyboard 40 with the apparatus 30 connected inline. Referring to FIG. 13, the PS/2 apparatus is electrically connected to the host through the "power" 52, "data" 54, "clock" 56, and "ground" 58 lines along the PS-2 bus. Referring to FIG. 14, when the apparatus 30 is a PS/2 apparatus, it comprises 3 functional blocks, namely:

(1) a CPU processor or micro-controller 100;
(2) a Memory/Storage unit 140; and
(3) an enumerating as keyboard Switch 150.

The host 10 may be a computer, personal digital assistant, cellular telephone or other suitable equipment.

Figure 3:
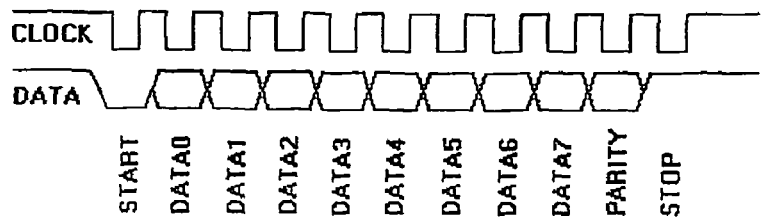
FIG. 3 illustrates device-to-host PS/2 communication.
Figure 4:
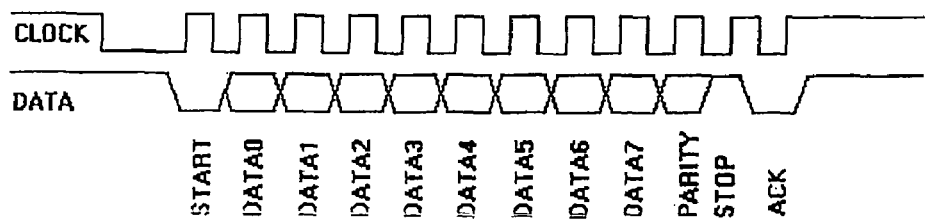
FIG. 4 illustrates host-to-keyboard PS/2 communication.
Figure 5:
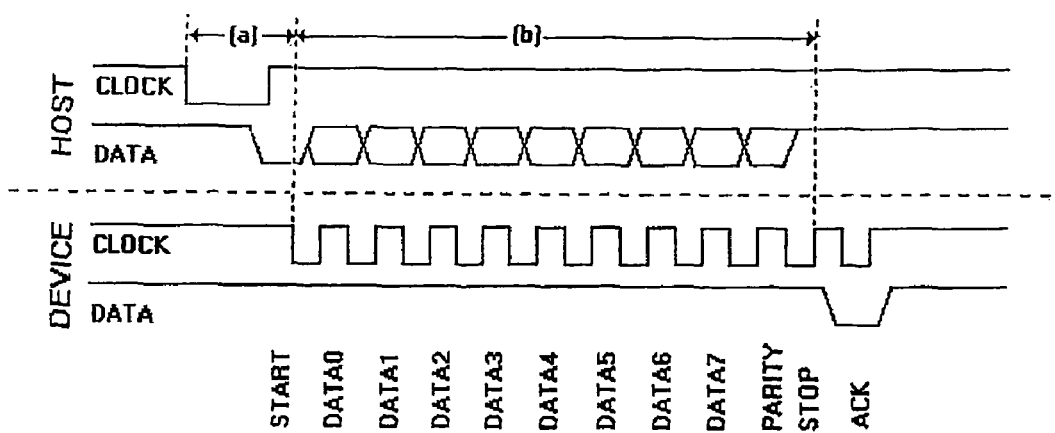
FIG. 5 is a more detailed diagram of host-to-keyboard PS/2 communication.
Figure 6:
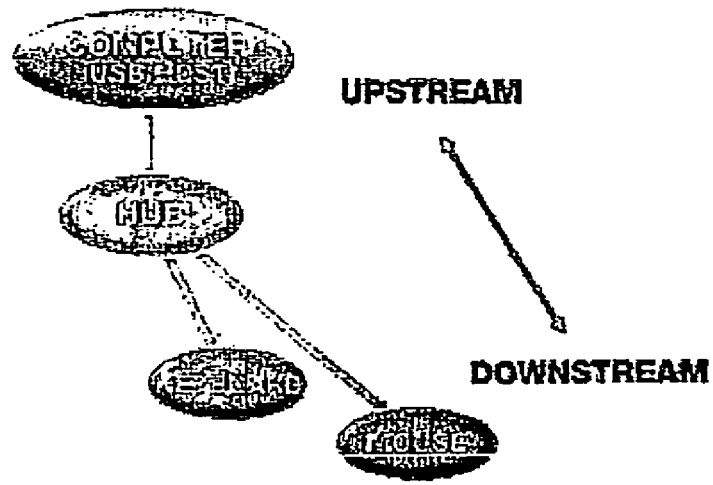
FIG. 6 is a schematic diagram of a typical USB system.
Figure 7:
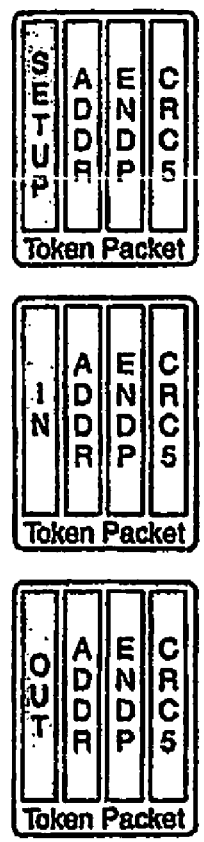
FIG. 7 is a schematic diagram of a USB data packet.

The micro-controller 100 is the command and control system for the PS/2 apparatus. It functions as a central processing unit and contains various types of firmware including: Data Sense (Keyboard monitor) 102; Clock sense 104; Memory interface 106; Decoder 120, Password recogniser 108; "Power" 110; "Ground" 112 and "received buffer" 114. The PS/2 apparatus is able to ascertain the direction of communication, that is, whether the information is being sent host-to-device or device-to-host, by reading voltages at the clock and data lines using the clock sense 104 and data sense 102 respectively, and determining whether the data line is high or low when clock is initially driven low (see FIGS. 2 and 3 and the background section above). The apparatus then synchronously reads the serialized bits from these lines, and puts the complete 8-bit data byte(s) into its memory 140 via the memory interface 106 in the micro-controller 100 or alternatively having received a particular sequence of data (ie a series of 8 num-lock toggle commands), the apparatus reroutes the information via the received buffer 114, Decoder 120 and Password Recogniser 108 where further processing may be performed. By this method, it can filter out host-to-keyboard communications for processing and decoding the host to apparatus communication protocol. If the password recogniser 108 reads a specific sequence of data, the apparatus activates the switch 150 which isolates the keyboard, and then the apparatus acts as a PS/2 data source, uploading its stored keystroke data held in its memory 140 to the host with an implementation of the PS/2 protocol.

Figure 15A:
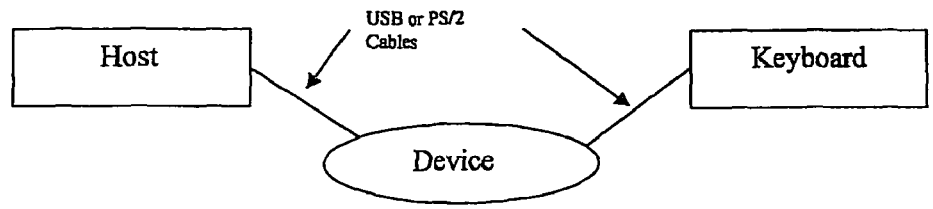
FIGS. 15A and 15B (collectively "FIG. 15") show how a USB apparatus can be connected to the keyboard to allow monitoring of keystroke commands.
Figure 15B:
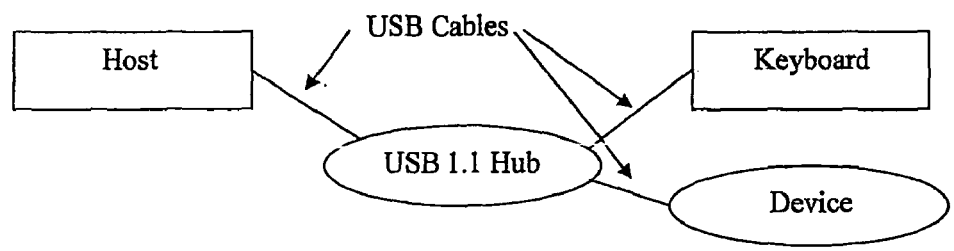
Figure 16:
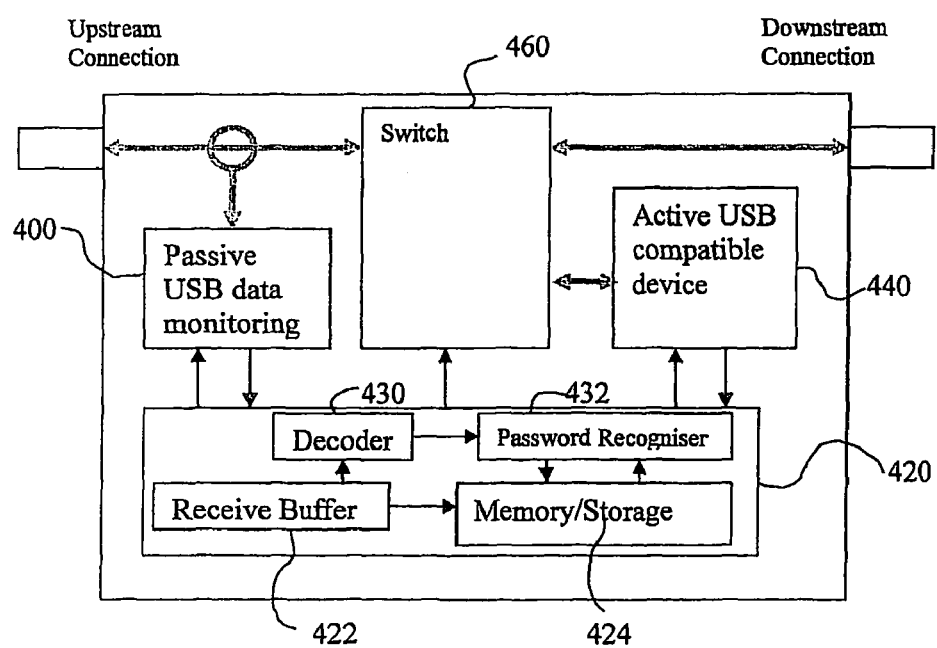
FIG. 16 shows the apparatus connected inline along a USB port utilising USB protocol.

The USB apparatus uses a similar method to communicate according to the protocol, although the internal hardware modules and its method of monitoring data on the USB cable differ from the PS/2 apparatus. Only the features necessary for the invention to communicate according to the protocol are disclosed. The USB apparatus can be connected directly inline or via a hub (see FIG. 15) although it should remain undetected by the host while monitoring keystrokes. Referring to FIG. 16, when the apparatus 30 is a USB apparatus, it comprises four functional blocks, namely:

(1) Passive USB monitoring module 400;
(2) Micro-controller 420;
(3) Active USB device 440; and
(4) Switch 460.

The passive USB monitoring module functions like the 'clock' 104 and 'data' 102 senses in the PS/2 apparatus, by 'listening' to the data being sent along the USB cable. All OUT packets are checked for addresses on the sniffed device list corresponding to the USB keyboard (see FIG. 12 USB Basics). The micro-controller has a 'receive buffer' 422 used to receive data sent according to the protocol, Decoder 430, Password recogniser 432, and integral memory module 424 for data storage. The data contained in the OUT (PID 0001) packets going to the keyboard are buffered and analysed by the micro-controller 420 against the specific enumeration sequence and stored in the integral memory 424. Once the given data sequence is detected, the invention enumerates as an active USB device 440, connecting it to the USB bus via the switch 460, and the apparatus becomes 'visible' to the host and can communicate via standard interrupt packets (see USB Basics).

Figure 17:
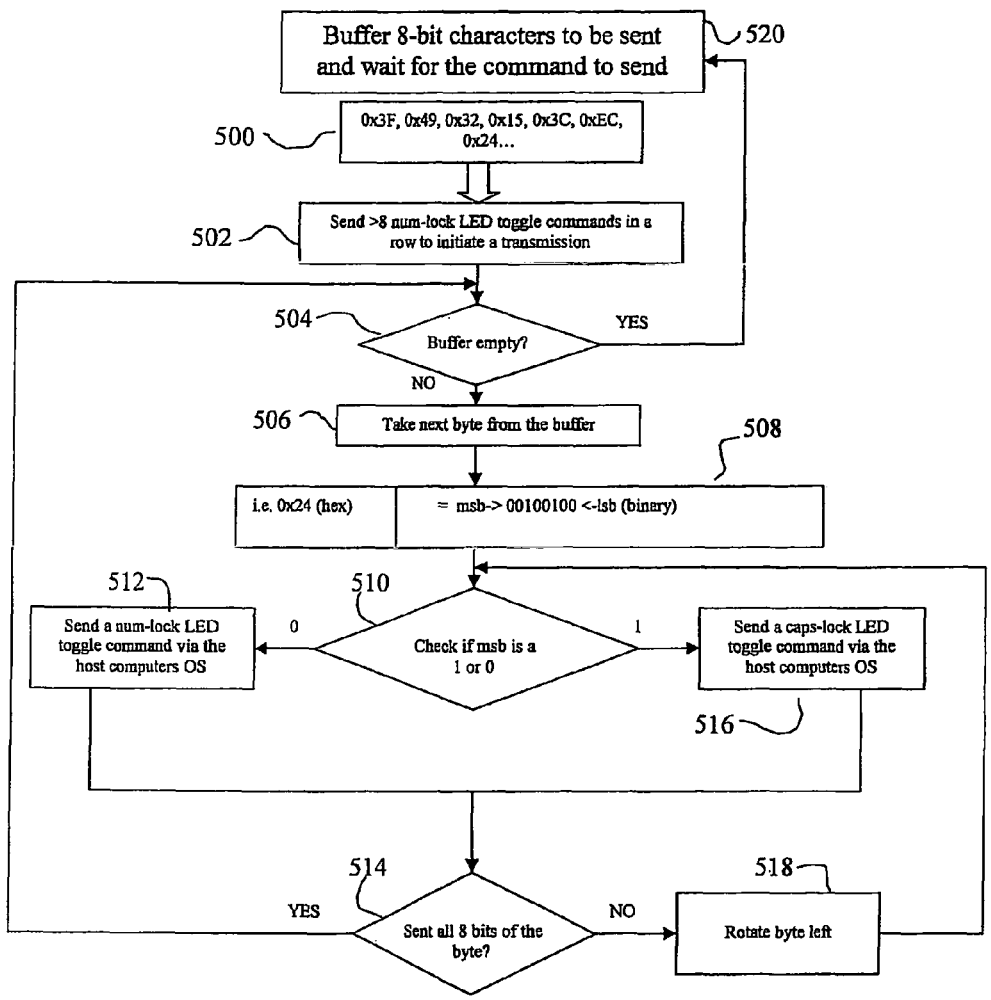
FIG. 17 is a flowchart showing how the host encodes data and sends it to the apparatus according to the protocol.

To encode the novel communication protocol, a stream of bytes that need to be sent to the apparatus from the host over the PS/2 or USB bus interface are stored in a buffer in the host, and then each byte is extracted and the bits in that byte are serialized, coded, and sent using the novel protocol. FIG. 17 provides a flow chart outlining the process whereby the host encodes the data according to the protocol. It should be understood that the exemplary process illustrated may include more or less steps or may be performed in the context of a larger processing scheme. Furthermore, the various flow charts presented in the drawing figures are not to be construed as limiting the order in which the individual process steps may be performed. Referring to FIG. 17, when the host has data stored in the buffer 500 and is ready to transfer, the apparatus is then put in a "reset" mode by the host, which sends information over the PS/2 or USB interface to the keyboard, to toggle the num-lock LED 8 (or more) times at 502. This resets the "receive buffer" (114 or 422) in the PS/2 or USB apparatus according to the disclosed communication protocol. The signal to put the receive buffer of the apparatus into a "ready-to-receive" mode and begin to clock in the bits of data from the first byte in the host's byte buffer, is a toggle of the status of the caps-lock LED by the host over the PS/2 or USB bus interface. The host is now ready to send data by "clocking out" the individual bits of the data, and the apparatus is ready to "clock in" these bits. This terminology is more appropriate for the PS/2 apparatus although the process is the same in the USB apparatus. The first byte in the host's buffer 500 is extracted and will be sent to the apparatus. It is split up into bits, either "MSB to LSB" (this stands for Most Significant Bit to Least Significant Bit) or "LSB to MSB" (for the purpose of illustration the data is split "MSB to LSB").

The host checks whether the MSB is '1' or '0' at 510 at which point the host will send a caps-lock LED toggle command (516) or num-lock LED toggle command (512) respectively. The byte is rotated left and the next MSB analysed and respective command toggles sent until all bits in the byte are sent (514). The LED toggle commands encoding the 8 bits are stored in another buffer at 520 and await a command to be sent to the apparatus, which will sequentially analyse it via the apparatus's Decoder (120 in PS/2, 430 in USB) according to the disclosed protocol. The data bytes (8 bits) are then clocked into the apparatus, whereby commands sent to the apparatus over the PS/2 or USB bus that correspond to a toggle of the num-lock LED code for a "0", and a toggle of the caps-lock LED code for a "1" and are recognised by the apparatus as encoding a data stream according to the disclosed protocol. Once the apparatus has received the 8 bits of the data byte, it puts the data byte in a "received" buffer (422 in USB, 114 in PS/2 apparatus), and awaits the next 8 bits (see later discussion of FIG. 18). The steps from 504 to 518 are repeated until the data bytes on the host have been transmitted to the apparatus (ie the buffer at 500 is empty). Before being sent to the apparatus's memory/storage (140 in PS/2, 424 in USB apparatus), the Decoder (120 in PS/2, 430 in USB apparatus) analyses the data in the "received" buffer, and executes the appropriate commands/actions from this information, for example, the data is analysed by the password recogniser 432 in USB apparatus or 'password recogniser' 108 in PS/2 apparatus for a specific sequence that causes the switch (150 in PS/2, 460 in USB apparatus) to activate and for the apparatus to upload its stored data to the host 10 by enumerating as a keyboard. The method of encoding the protocol is the same for USB or PS/2 apparatus, although information can be transferred directly to and from a USB apparatus normally, without having to encode the protocol, once it receives the command to switch to enumerate as an active USB apparatus.

Figures 21, 22:
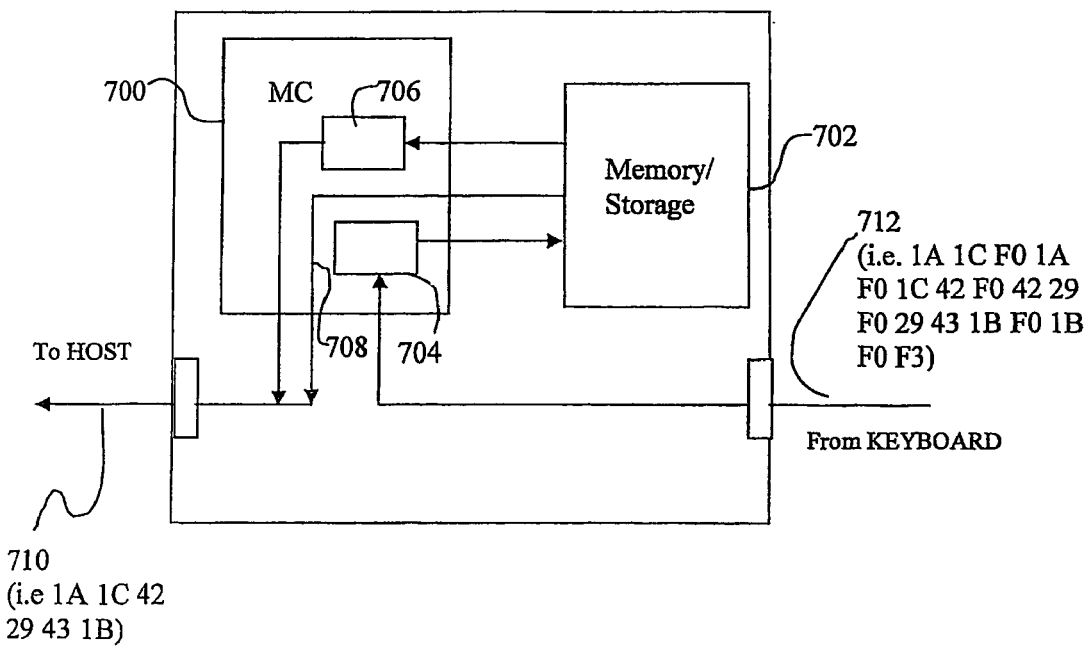
FIG. 21 is an example of a binary data stream sent host-device-host to toggle num-lock LED in USB keyboard.
FIG. 22 is a block diagram of the basic structure of the invention with the modules that allow high-speed data transfer to the host, connected inline along a PS/2 port utilising PS/2 protocol.

As stated previously, the apparatus decodes the data by listening to LED toggle commands sent by the host to the keyboard, however, different commands are used to communicate with PS/2 or USB keyboards and therefore the method of decoding the data in the PS/2 or USB apparatus varies slightly although the basic protocol is the same. An example of data sent between the host and keyboard to toggle a PS/2 keyboard LED is illustrated in FIG. 20. For PS/2 keyboards, the command 0xED is used to set/reset the keyboard LED's. The host follows this command with one 'argument' byte that specifies the state of the keyboard's Num Lock, Caps Lock, and Scroll Lock LEDs. An example of an argument byte is shown in FIG. 19, and the first 5 MSB's are always '0'. After an argument byte is sent, the PS/2 keyboard acknowledges its receipt by sending an 0xFA command. A command to toggle an LED in a USB keyboard is achieved by sending an interrupt data packet (see USB basics). Referring to FIG. 21, the host first sends an out token followed by a data packet (that contains the LED toggle command), and the USB keyboard acknowledges successful receipt of the command with an ACK packet.

Figure 18:
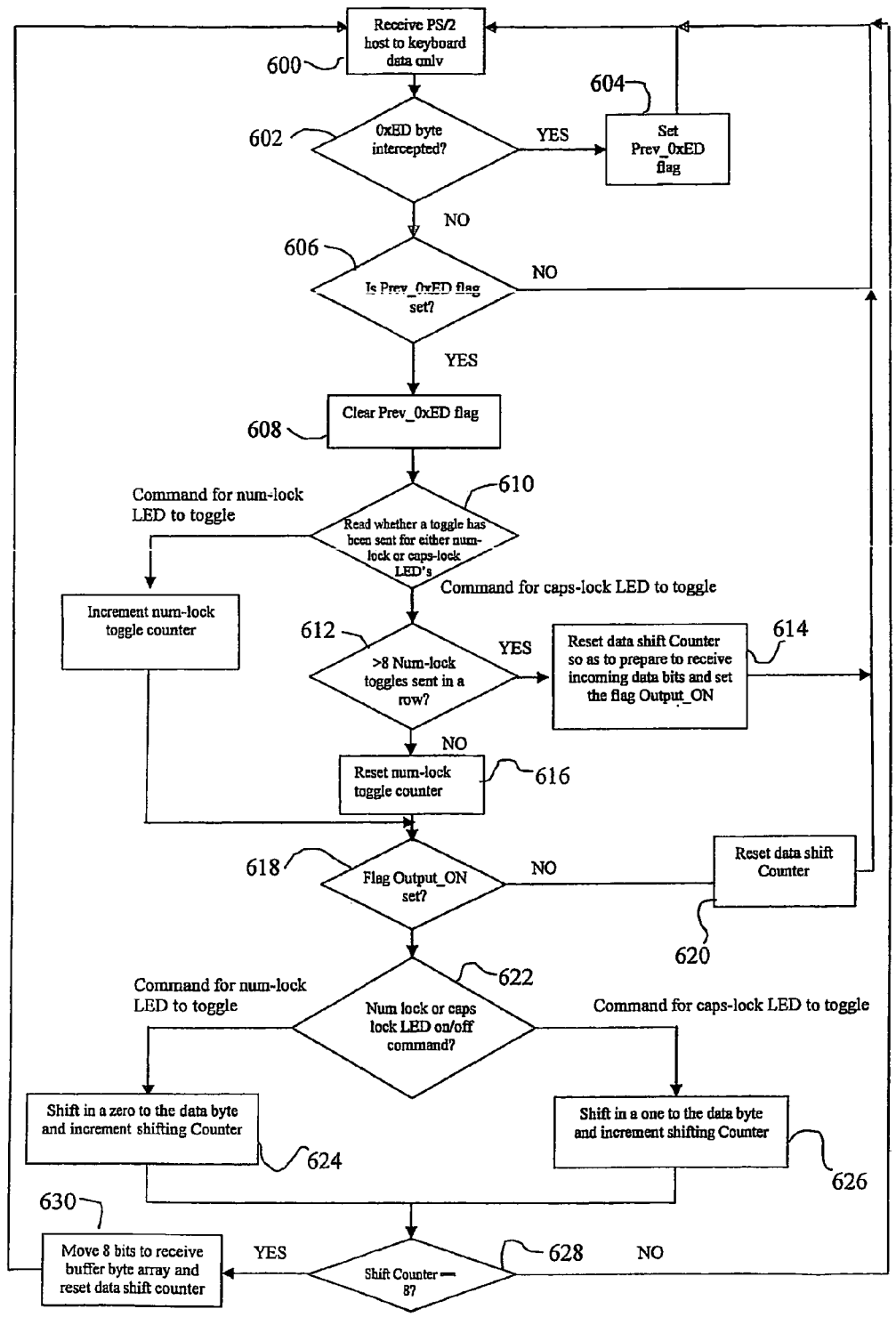
FIG. 18 is a flowchart of a practical application of a PS/2 apparatus decoding the command protocol sent by the host.

The flow chart in FIG. 18 gives a practical application of a PS/2 apparatus decoding the protocol. The USB apparatus uses the same method, however, boxes 602-608 are not applicable in the USB apparatus. Starting at 600 the apparatus passively monitors all commands sent through the PS/2 or USB cable. As can be seen from FIG. 20, the first byte sent by the host to toggle a PS/2 keyboard LED is an 0xED byte. The apparatus then is ready to listen to the next 'argument' byte (cf Data Packet in USB Keyboard). As previously stated, if more then 8 num-lock LED setting/clearing commands are sent (612) the apparatus is put into a 'ready to receive' mode 614, and when a caps lock command is sent it resets the receive buffer and the apparatus will start storing data in the 'receive buffer' (422) for analysis. The data-stream bits are converted into a binary data stream according to whether num-lock toggle ('0') or caps-lock toggle ('1') commands are received (see 622-626). Once 8 bits are received, the byte is sent to the storage (630) and the 'receive buffer' is emptied to increment more data bits and the process repeats itself until all data is sent. This data can be subsequently analysed by the apparatus.

Although the command to reset the LED of the keyboard caps-lock, num-lock or scroll-lock is one method of sending information from host to apparatus along a PS/2 or USB port, an alternative method would be to toggle the 'typematic rate' status byte of a PS/2 keyboard (with predetermined alternating rates encoding the binary portions of the data stream in a similar fashion to the disclosed method).

Referring now to FIG. 22, a method enabling the apparatus to filter stored keystroke data to be uploaded high-speed to the host and for the host to reconstruct the recorded keystrokes from the filtered data is disclosed. It should also be appreciated that the following description only includes features relevant to the invention's ability to process data sent to the host according to the method disclosed (which only applies in PS/2 keyboards or their equivalent), and that the modules described in the figures below and their function overlaps the function of the modules already described earlier in the document.

Referring to FIG. 22, the apparatus utilising the method in its preferred embodiment contains 2 functional blocks, namely:
 (1) a micro-controller 700; and
 (2) a storage/memory module 702.
 In order to facilitate the method disclosed, the micro-controller contains 'break code removal' 704 and 'break code regeneration' 706 program both of which are standard control programs.

For data retrieval and keystroke reconstruction by the host, the apparatus attached to the keyboard only needs to transmit the sequence that is pressed. It is not important when the keys are released (Unless more than one key needs to be pressed in order to execute the command ie the CTRL-ALT-DEL command). The apparatus's modification to the PS2 protocol uses a programme command to filter out the 'break codes' by recognising the F0 code sent by the keyboard (or E0 F0 for certain keys having an E0 in the code) and ignoring the next data packet sent (comprising the 'break' code).

The truncated 'make' portion of the data is sent to the apparatus's storage module, and if the high-speed transmission option is enabled, and the hardware keystroke-recording apparatus is requested to upload the recorded key strokes, the 'make' codes are downloaded directly to the host without the 'break' codes being regenerated by the apparatus. The latter would occur if the high-speed download option was not enabled. The speed increase factor S is for any make code length l, is given by $S=(2+1)/l$. For example, a simple key like the 'A' it would have a speed increase of three times. Once the filtered data stream is downloaded to the PCU host the information can be reconstructed by host software to display the recorded keystrokes.

The scan codes created by typing on a PS/2 keyboard (i.e. 1A 1C F0 1A F0 1C 42 F0 42 29 F0 29 43 1B F0 1B F0 F3) using standard PS2 protocol are transmitted to the host via PS/2 cable and are intercepted by the apparatus and enter the input line 712. The apparatus uses a filter command 704 in the micro controller 700 to remove the 'break' codes in the data stream and the filtered data stream (i.e. 1A 1C 42 29 43 1B) is recorded in the storage module 702. When the host requests the stored keystrokes and the high-speed transfer option is enabled, the make codes are downloaded from storage module 702 via pathway 708 to output line 710, which skips the 'break' code regeneration phase 706. The recorded data stream is then reconstructed by retrieval software in the PCU to display recorded keystrokes or sends them to be viewed elsewhere on the network.

To illustrate, an example of the shortened data stream before and after the filtering process is described below:
Before Filter:
1A 1C F0 1A F0 1C 42 F0 42 29 F0 29 43 1B F0 1B F0 43
After Filter:
1A 1C 42 29 43 1B Because of the reduction in the amount of scan code data transmitted per keystroke, with the application of the invention the equivalent keystroke information can be transmitted at a much higher speed (up to three times) than previously possible directly into any text editor, text box and/or retrieval/analysis software. There may also be software that directly 'hooks' the data from the keyboard to save it to a file and/or other media It thus can be seen that the present apparatus has a significant advantage over the prior art by allowing a faster download speed of the recorded keystrokes to the host due to the reduction in scan code being transmitted per keystroke.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. A method of communicating with a monitoring apparatus, wherein the monitoring apparatus is configured to monitor a communication channel without being detected, including the steps of:
    a) encoding first data as a sequence of status signals according to a monitoring apparatus communication protocol, wherein the first data is intended for receipt by the monitoring apparatus;
    b) sending the status signals from a host on a communication channel linking the host and an auxiliary device, the status signals being sent according to an interface protocol different to the monitoring apparatus communication protocol;
    c) detecting the status signals on the communication channel using the monitoring apparatus; and
    d) decoding the status signals in the monitoring apparatus to retrieve the first data.

2. A method as claimed in claim 1, including saving the first data in the monitoring apparatus.

3. A method as claimed in claim 1, wherein steps a) and b) are performed in response to receiving a command from a remote device at the host.

4. A method as claimed in claim 3, wherein the remote device communicates with the host via a computer network.

5. A method as claimed in claim 4, wherein the computer network is the Internet.

6. A method as claimed in claim 1, wherein the monitoring apparatus is connected in-line between the host and the auxiliary device.

7. A method as claimed in claim 6, wherein the monitoring apparatus monitors the communication channel linking the host and the auxiliary device for specific sequences of status signals.

8. A method as claimed in claim 7, wherein the monitoring apparatus monitors communications between the host and the auxiliary device for a first specific sequence of status signals and wherein, when the monitoring apparatus detects the first specific sequence of status signals, it uploads second data from its memory to the host.

9. A method as claimed in claim 8, wherein the second data is keystroke data.

10. A method as claimed in claim 7, wherein the monitoring apparatus monitors communications between the host and the auxiliary device for a first specific sequence of status signals using a password recogniser.

11. A method as claimed in claim 7, wherein the monitoring apparatus monitors communications between the host and the auxiliary device for a first specific sequence of status signals and wherein, when the monitoring apparatus detects the first specific sequence of status signals, it begins receiving data in a receive buffer.

12. A method as claimed in claim 1, wherein the auxiliary device is a human interface device.

13. A method as claimed in claim 12, wherein the auxiliary device is a keyboard.

14. A method as claimed in claim 13, wherein the status signals are keyboard command status signals.

15. A method as claimed in claim 14, wherein at least some of the keyboard command status signals are num-lock toggle commands.

16. A method as claimed in claim 14, wherein at least some of the keyboard command status signals are caps-lock toggle commands.

17. A method as claimed in claim 14, wherein at least some of the keyboard command status signals are scroll lock toggle commands.

18. A method as claimed in claim 14, wherein at least some of the keyboard command status signals are typematic rate byte toggle commands.

19. A method as claimed in claim 1, wherein the communication channel is a PS/2 communication channel, the monitoring apparatus is a PS/2 keystroke recording apparatus and the interface protocol is a PS/2 protocol.

20. A method as claimed in claim 1, wherein the communication channel is a USB communication channel, the monitoring apparatus is a USB keystroke recording apparatus and the interface protocol is a USB protocol.

21. A method as claimed in claim 20, wherein the monitoring apparatus monitors communications between the host and the auxiliary device for packets with addresses corresponding to the auxiliary device.

22. An apparatus including a processor and a memory, wherein the processor includes:
    a data monitor to detect a sequence of status signals on a communication channel linking a computer and an auxiliary device, the status signals being sent over the communication channel according to an interface protocol, wherein the data monitor is configured to monitor the communication channel without being detected; and
    a decoder to decode the sequence of status signals and retrieve first data encoded in the sequence of status signals according to a monitoring apparatus communication protocol different to the interface protocol.

23. An apparatus as claimed in claim 22, configured to store the first data in the memory.

24. An apparatus as claimed in claim 22, including means to upload data from the memory to the computer via the communications channel in response to detecting a specific sequence of status signals.

25. An apparatus as claimed in claim 22, wherein the processor includes a receive buffer and the apparatus is configured to begin receiving data in the receive buffer in response to detecting a specific sequence of status signals.

26. An apparatus as claimed in claim 22, wherein the apparatus is a PS/2 keystroke-recording apparatus and the interface protocol is a PS/2 protocol.

27. An apparatus as claimed in claim 22, wherein the apparatus is a USB keystroke-recording apparatus and the interface protocol is a USB protocol.

28. An apparatus as claimed in claim 27, wherein the data monitor is a passive USB monitoring module; the apparatus further including an active USB device module.

29. A system including a host, an auxiliary device and a monitoring apparatus, the host being connected to the auxiliary device via a communication channel and the monitoring apparatus being configured to:

detect status signals on a communication channel between the host and the auxiliary device; and decode the status signals to retrieve data encoded in the status signals according to a monitoring apparatus communication protocol, the status signals being sent over the communication channel according to an interface protocol different to the monitoring apparatus protocol; and monitor the communication channel without being detected.

\* \* \* \* \*